United States Patent [19]
Woodward et al.

[11] Patent Number: 6,151,318
[45] Date of Patent: Nov. 21, 2000

[54] METHOD AND APPARATUS FOR ENCAPSULATING ATM CELLS IN A BROADBAND NETWORK

[75] Inventors: Ernest Earl Woodward, Chandler; Ali Elahi, Scottsdale; Jeffrey Martin Harris, Chandler, all of Ariz.

[73] Assignee: Motorola, Inc., Schaumburg, Ill.

[21] Appl. No.: 09/110,374

[22] Filed: Jul. 6, 1998

[51] Int. Cl.⁷ ........................................................ H04J 3/26
[52] U.S. Cl. ............................ 370/392; 370/471; 370/474
[58] Field of Search ..................................... 370/392, 395, 370/471, 474

[56] References Cited

U.S. PATENT DOCUMENTS

| | | | |
|---|---|---|---|
| 5,533,021 | 7/1996 | Branstad et al. | 370/60.1 |
| 5,615,210 | 3/1997 | Kaiyama et al. | 370/389 |
| 5,717,689 | 2/1998 | Ayanoglu | 370/349 |
| 5,737,595 | 4/1998 | Cohen et al. | 395/611 |
| 5,978,361 | 11/1999 | Kokudo | 370/280 |

FOREIGN PATENT DOCUMENTS

| | | | |
|---|---|---|---|
| 0768806 | 4/1997 | European Pat. Off. | H04Q 11/04 |
| 0813346 | 12/1997 | European Pat. Off. | H04Q 7/24 |
| 9818246 | 4/1998 | WIPO | H04L 29/02 |

OTHER PUBLICATIONS

A publication entitled, "Integrated Services Digital Network (ISDN) General Structure, B–ISDN Asynchronous Transfer Mode Functional Characteristics", published by International Telecommunication Union, (Nov. 1995), 14 pages.

A publication entitled, "Integrated Services Digital Network (ISDN) Overall Network Aspects and Functions, B–ISDN ATM Layer Specification", published by International Telecommunication Union, (Nov. 1995), 32 pages.

Lo, B.C.M. et al., 'Link Design and Capacity Comparison of Burst Transmission Methods for ATM Cells and AAL PDUs Over Broadband Satellites', CCECE'97, IEEE, pp. 676–679, May 1997.

Losquadro, G. et al., 'Requirements of Multiregional Mobile Broadband Satellite Networks', IEEE Personal Communications, pp. 26–30, May 1997.

*Primary Examiner*—Melvin Marcelo
*Attorney, Agent, or Firm*—Dana B. LeMoine; James E. Klekotka; Frank J. Bogacz

[57] ABSTRACT

A system for encapsulating ATM cells into larger data packets to be transmitted through a broadband communications system includes an ATM cell receiver (410), a data packet formatter (430), a buffer (434), and a data packet formatter controller (438). The ATM cell receiver (410) receives ATM cells and sends them to the buffer (434) which is included within the data packet formatter (430). Data packet formatter controller (438) controls the insertion of ATM cells into the buffer (434), and also optionally compresses the ATM cells to increase the apparent bandwidth of the system.

15 Claims, 4 Drawing Sheets

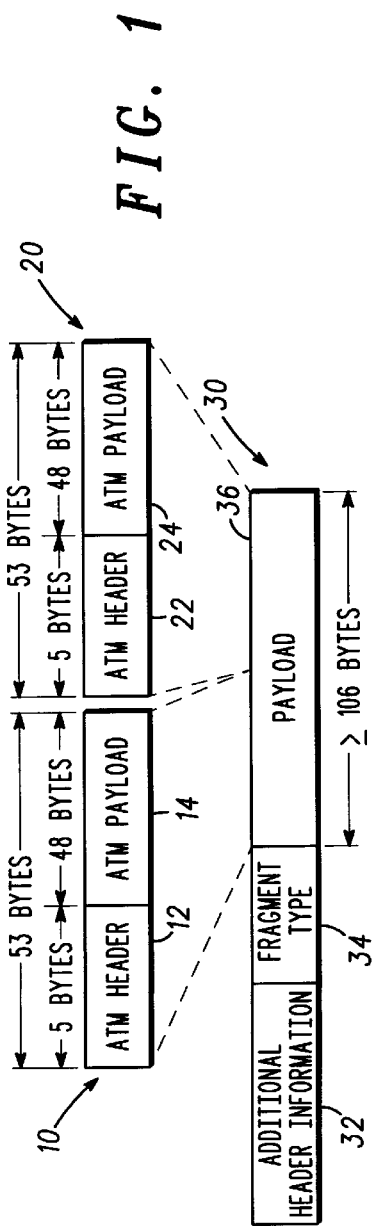

METHOD AND APPARATUS FOR ENCAPSULATING ATM CELLS IN A BROADBAND NETWORK

FIELD OF THE INVENTION

This invention relates in general to the encapsulation of non-native data packets in a communications system, and in particular, to the encapsulation of ATM cells in a broadband network.

BACKGROUND OF THE INVENTION

Asynchronous Transfer Mode (ATM) packets (or cells) are 53 bytes long. By providing a fixed length cell, the ATM protocol reduces latency. This makes ATM desirable for latency sensitive applications, such as voice.

Modern broadband satellite communications systems generally have longer packet sizes than ATM. One reason broadband satellite communications systems have longer packet sizes is for signal acquisition purposes. Because signal acquisition in a satellite communications system takes a finite amount of time, optimum packet sizes are generally larger than 53 bytes.

It is desirable for satellite communications systems to be able to carry ATM traffic which emanates from a source external to the satellite communications system because of the potential revenue generated from the sale of bandwidth. Because satellite communications systems generally have larger packet sizes than ATM, bandwidth can be lost if a single ATM cell is assigned to a single, longer, satellite communications system packet.

What is needed is a method and apparatus for efficiently encapsulating ATM packets in a broadband network having packet sizes greater than 53 bytes.

BRIEF DESCRIPTION OF THE DRAWINGS

FIG. 1 shows a diagram of multiple ATM cells encapsulated in a single packet in accordance with a preferred embodiment of the present invention;

FIG. 2 shows a diagram of multiple ATM cells encapsulated within multiple packets in accordance with a preferred embodiment of the present invention;

DETAILED DESCRIPTION OF THE DRAWINGS

Figure 3:
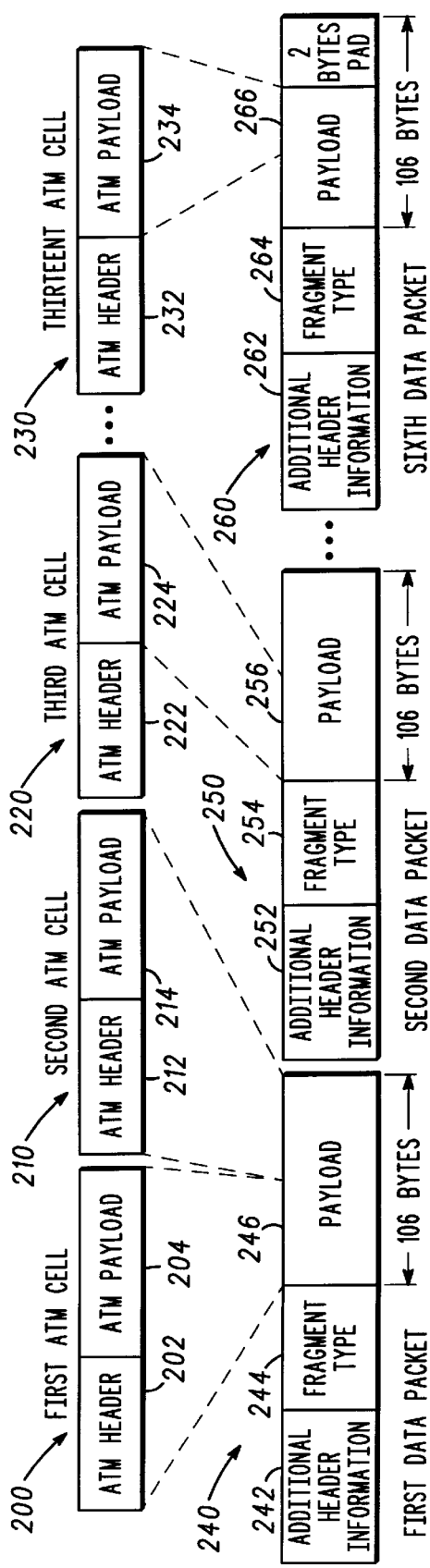
FIG. 3 shows a diagram of multiple ATM cells encapsulated within multiple packets in accordance with an alternate embodiment of the present invention.

The method and apparatus of the present invention provides an advantageous means for encapsulating ATM cells within larger data packets for transmission in a satellite communications system. A "source node" within the system receives ATM cells from sources outside the system. The source node then optionally compresses some or all of the ATM cells and packs the ATM cells into data packets for transmission within the system. A "receiving node" within the system receives the data packets, removes the ATM cells from within, decompresses them as necessary, and sends them on to their intended destination outside the system.

Turning now to the drawings in which like reference characters indicate corresponding elements throughout the several views, attention is first directed to FIG. 1. FIG. 1 shows a diagram of multiple ATM cells encapsulated in a single packet in accordance with a preferred embodiment of the present invention. FIG. 1 shows ATM cells 10 and 20. FIG. 1 also shows data packet 30 which is a data packet in a format native to the satellite communications system.

ATM cell 10 includes ATM header 12 and ATM payload 14. ATM header 12 is five bytes long, and ATM payload 14 is 48 bytes long. ATM cell 10, including ATM header 12 and ATM payload 14, is 53 bytes long. Likewise, ATM cell 20 includes ATM header 22 and ATM payload 24, for a total cell length of 53 bytes.

ATM payloads 14 and 24 include information destined for a single user or multiple, separate users. For example, ATM cell 10 may be comprised of information sent by a first user and destined for a second user, and ATM cell 20 may be comprised of information sent by a third user and destined for a fourth user. ATM payloads 14 and 24 include information which is of interest to the users to whom it is addressed. ATM headers 12 and 22, on the other hand, are of little interest to the users to whom they are addressed; however, headers 12 and 22 can be of great importance to the networks through which ATM cells 10 and 20 are transmitted. For example, ATM headers 12 and 22 include routing information such as the virtual path identifier (VPI) and the virtual channel identifier (VCI), and error detection information such as header error check (HEC). ATM cells and their contents, including the VPI, VCI, and HEC header fields are discussed and explained in detail in Telecommunication Standardization Sector of International Telecommunications Union (ITU-T) publications I.150 and I.361 entitled "Integrated Services Digital Network (ISDN) General Structure, B-ISDN Asynchronous Transfer Mode Functional Characteristics," and "Integrated Services Digital Network (ISDN) Overall Network Aspects and Functions, B-ISDN ATM Layer Specification" respectively, the contents of which are hereby incorporated by reference.

When ATM cells 10 and 20 are destined for separate users, ATM headers 12 and 22 will include different information, in part because they will be routed to separate destinations. When ATM cells 10 and 20 are destined for the same user, however, ATM headers 12 and 22 may contain identical information. In any case, it is important for data packet 30, when encapsulating ATM cells 10 and 20, to see that ATM cells 10 and 20 are routed to the users to whom they are intended.

Data packet 30 includes header information comprising fragment type 34 and additional header info 32. Data packet 30 also includes payload 36 which is greater than or equal to twice the length of the normal ATM packet, or 106 bytes. Additional header info 32 can include any header information necessary for the satellite communications system including, but not limited to, network header information and transport header information. Fragment type 34 is used to signal to the satellite communications system the contents of payload 36.

In a preferred embodiment, payload 36 is exactly 106 bytes long. When payload 36 is exactly 106 bytes long, two complete ATM cells fit within payload 36. This is advantageous in part because the system can always assume that ATM cell boundaries occur at system data packet boundaries. This allows for efficient decapsulation of the ATM cells at the receiving node of the satellite communications system. This approach is also advantageous in part because, by leaving the entire ATM cell intact, including header information, when ATM cells 10 and 20 are removed from payload 36, they can be easily routed to their appropriate destinations.

One inherent advantage of ATM is low latency. ATM cells are small and are ideally not buffered for a long period of time. If ATM cells become buffered for any significant period of time, one of the main advantages of ATM can be lost. Accordingly, it is desirable for the method and apparatus of the present invention not to cause buffering of any one ATM cell for too long. In a preferred embodiment as shown in FIG. 1, payload 36 is built by first inserting ATM cell 10, and then inserting ATM cell 20. When ATM cells are flowing into the satellite communications system in a continuous stream, payload 36 will be built very quickly. For example, ATM cell 10 will be received by the satellite communications system, and shortly thereafter ATM cell 20 will be received by the satellite communications system. In this scenario, ATM cell 20 is received very quickly after ATM cell 10 is received, payload 36 is built using both ATM cell 10 and ATM cell 20, and payload 36 is fully utilized. It is possible, however, for ATM cell 10 to be received by the satellite communications system, and for ATM cell 20 to not be received shortly thereafter. In this scenario, payload 36 will be built using ATM cell 10 alone. When ATM cell 10 is sent alone, and payload 36 is not fully utilized, system bandwidth may be wasted; however, low latency of ATM cell 10 is advantageously preserved.

After data packet 30 is transmitted through the satellite communications system, ATM cells 10 and 20 are removed from payload 36 and sent to their intended destinations. In a preferred embodiment, fragment type 34 always contains the same descriptor, and when the second ATM cell is not received in time to be included in the data packet, an empty cell is inserted instead. When the data packet is received at the receiving node within the satellite communications system, the node decapsulates ATM cell 10, recognizes the second ATM cell within payload 36 as an empty cell, and discards it.

In an alternate embodiment, fragment type 34 is used within data packet 30 to signify whether a single ATM cell is included within payload 36, or multiple ATM cells are included within payload 36. When payload 36 is built, and only ATM cell 10 is included therein, fragment type 34 is set to the value of a first descriptor. When payload 36 is built, and both ATM cells 10 and 20 are included therein, fragment type 34 is set to the value of a second descriptor. After data packet 30 has been routed through the satellite communications system, any ATM cells included within payload 36 are reconstituted and sent on their way outside the satellite communications system. When the fragment type includes the value of the first descriptor, the receiving node can detect that payload 36 only includes a single ATM cell, and when the fragment type includes the value of the second descriptor, the receiving node can detect that payload 36 includes both ATM cells 10 and 20.

The format of data packet 30 as shown in FIG. 1 provides many advantages. Because the system utilizes data packets larger than a single ATM cell, acquisition time within the satellite communications system is advantageously increased. By including a fragment type field within data packet 30, the system can send a variable number of ATM cells within a single data packet, thereby advantageously preserving the inherently low latency of ATM systems.

FIG. 2 shows a diagram of multiple ATM cells encapsulated within multiple packets in accordance with a preferred embodiment of the present invention. FIG. 2 shows ATM cells 100, 110, 120, and 130. FIG. 2 also shows data packets 140 and 150. Data packets 140 and 150 are generally of the same type as data packet 30 (FIG. 1). That is, the payload fields within data packets 140 and 150 are greater than or equal to 106 bytes, and are preferably exactly 106 bytes. Data packets 140 and 150 also include fragment type fields 144 and 154 respectively; however, fragment type fields 144 and 154 are put to a slightly different use than is fragment type 34 (FIG. 1).

Four ATM cells and two data packets are illustrated in FIG. 2 for exemplary purposes. In operation, many more ATM cells will generally be encapsulated in many more data packets. In fact, typical numbers of packets are measured in the millions. This is not a limitation of the present invention, however, because in theory, ATM cells could be encapsulated in data packets continuously, resulting in an infinite number ATM cells being encapsulated in an infinite number of data packets. In this description, when one or more ATM cells or data packets are described with reference to FIG. 2, it is to be understood that the discussion extends to any and all ATM cells and data packets within the system.

ATM cell 100 includes compressed ATM header 102, and ATM payload 104. ATM payload 104 is 48 bytes long, which is the standard length for any ATM payload. Compressed ATM header 102, however, differs in length from the standard ATM header length. Compressed ATM header 102 is less than five bytes in length. In a preferred embodiment, compressed ATM header 102 has had the VPI and VCI fields removed, resulting in a header length of two bytes. Compressed ATM header 12 can also have the VPI field removed by itself, the VCI field removed by itself, or both can be removed. Moreover, either or both of the VCI and VPI fields can be removed in conjunction with any other of the standard ATM header fields.

In a preferred embodiment, compressed ATM headers 102, 112, 122, and 132 are all compressed in the same manner. When ATM cells 100, 110, 120, and 130 are from a single originating user, and are destined for a single end user, the VCI and VPI portions of the ATM headers will be identical. It is this fact that allows for their removal. Because they are redundant, the VCI and VPI fields of compressed ATM headers 102, 112, 122, and 132 can be communicated through the satellite communications system a single time, and need not be transmitted within every ATM cell.

In an alternate embodiment, the compressed ATM headers have had the HEC fields removed. The removal of the HEC fields can be performed alone, or can be in conjunction with the removal of the VCI or VPI fields. The HEC fields can be removed for transmission because they can be reconstituted by the receiving node when leaving the satellite communications system. Processing resources are required to reconstitute the HEC field when the ATM cells and their associated HEC fields are reconstituted from the information included within payloads 146 and 156; however, the savings in bandwidth more than compensates for the additional utilization of processing power.

In the preferred embodiment exemplified by the diagram in FIG. 2, fragment types 144 and 154 are used to differentiate between the possible different combinations of compressed ATM cells included within payloads 146 and 156 respectively.

In a preferred embodiment, fragment type 34 is made up of two bits, thereby allowing four possible descriptors. One skilled in the art will understand that larger or smaller fields are possible, thereby allowing for more or less than four possible descriptors, while still practicing the present invention. The preferred utilization of the fragment type field is as follows:

| Descriptor | Definition |
|---|---|
| 00 | Beginning fragment of a multi-fragment case. This indicates that more data packets including fragments are to be expected. |
| 01 | Intermediate fragment of a multi-fragment case. This is the case of continuing multiple fragments. |
| 10 | Last fragment of a multi-fragment case. This serves as the last fragment flag and the last cell could be either an empty or a non-empty cell |
| 11 | Single fragment case. This indicates that either one or two cells are to be expected and the second cell's header indicates if it is an empty cell. |

Descriptor 00 is used for the first data packet which includes fragments of ATM cells. Descriptor 01 is used for all data packets in the data stream other than the first and last data packet. Descriptor 10 is used for the last data packet in the data stream. Descriptor 11 is used when one or two ATM cells are encapsulated within a single data packet, such as in the exemplary embodiment of FIG. 1.

In the exemplary embodiment of FIG. 2, fragment type 144 includes the value of the first descriptor, or 00, because data packet 140 is the first packet of a multi-fragment case. Also in the exemplary embodiment of FIG. 2, fragment type 154 includes the value of the third descriptor, or 10, because data packet 150 is the last data packet of a multi-fragment case. If, in the exemplary embodiment of FIG. 2, more data packets were utilized to carry ATM cells, those data packets would appear in the data stream between data packet 140 and data packet 150, and the fragment type of all those cells would include the second descriptor, or 01.

Fragment type fields within data packets are assigned descriptor values when the data packets are built. For example, in the exemplary embodiment of FIG. 2, a source node within the satellite communications system receives the ATM cells, compresses them, and builds the data packets. The source node receives ATM cell 100, compresses it, inserts it into payload 146 of data packet 140, and sets fragment type 144 to 00. The source node then receives ATM cell 110, compresses it, and inserts it into payload 146 of data packet 140. Then the source node receives ATM cell 120, compresses it, and inserts a portion into payload 146, and the rest into payload 156 of data packet 150. At this point, fragment type 154 could receive descriptor 01 or descriptor 10. If the source node were to receive many more ATM cells, payload 156 would be completely filled, and fragment type 154 would be set to descriptor 10. However, in the scenario embodied in FIG. 2, the source node only additionally receives ATM cell 130. When the source node receives ATM cell 130, it is compressed and inserted into payload 156 of data packet 150, and fragment type 154 is set to descriptor 10.

Data packet 150 includes a fragment of ATM cell 120, and all of ATM cell 130. If ATM cell 130 was not timely received at the source node, then only ATM cells 100, 110, and 120 would be encapsulated into data packets 140 and 150. Fragment type 144 of data packet 140 would still be set to descriptor 00, and fragment type 154 of data packet 150 would still be set to descriptor 10. Payload 156 would still include a portion of ATM cell 120, but would not include ATM cell 130. Instead, the portion of payload 156 which would otherwise be used for ATM cell 130 would be used for an empty ATM cell. In this case, when ATM cell 130 is received at the source node, ATM cell 130 will be placed in the payload field of a data packet which follows data packet 150, and this data packet will start another multi-fragment case.

FIG. 3 shows a diagram of multiple ATM cells encapsulated within multiple packets in accordance with an alternate embodiment of the present invention. The alternate embodiment of FIG. 3 combines desirable attributes of the embodiments shown in FIG. 1 and in FIG. 2. ATM cell 200 and ATM cell 210 are included within data packet 240 in a manner similar to that shown in FIG. 1. Fragment type 244 of data packet 240 is preferably set to descriptor 11, thereby marking data packet 240 as a data packet including one or two complete ATM cells.

After the first two ATM cells are included in data packet 240 without compression, the payload fields from 11 ATM cells are packed into payload fields of five additional data packets. For example, as shown in FIG. 3, third ATM cell 220 includes ATM header 222 and ATM payload 224. ATM header 222 is dropped, and ATM payload 224 is included within payload 256 of second data packet 250. ATM payloads from the fourth through twelfth ATM cells (not shown) are continuously packed into the payload fields of the second through sixth data packets (third through fifth not shown), spanning data packet payload fields where necessary. The fragment type fields of the third through fifth data packets receive descriptor 01. The last ATM cell in the stream, 13th ATM cell 230, is packed into payload 266 of data packet 260, leaving two unused bytes of the 106 bytes in payload 266. Fragment type 264 of data packet 268 receives descriptor 10.

The compression scheme shown in FIG. 3 is useful when all 13 ATM cells share a common header. When the header is common, it is redundant and need not be transmitted for each ATM payload. When the ATM cells share a common header, the payload of all six data packets will be utilized with the exception of two bytes in payload 266. This results in significant bandwidth savings.

Figure 4:
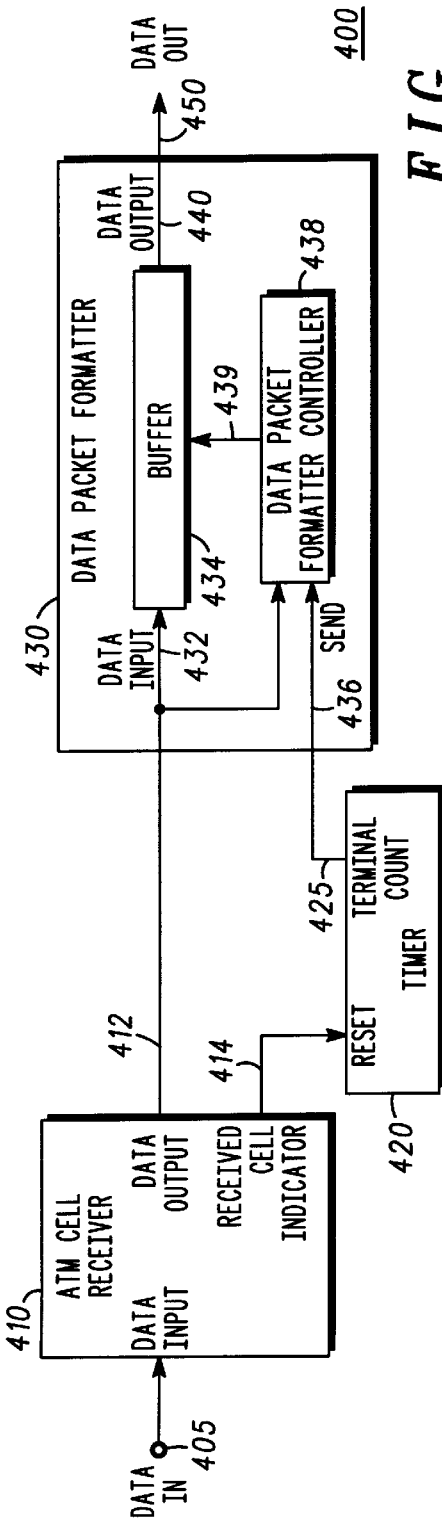
FIG. 4 shows a diagram of a source node for encapsulating ATM cells in larger packets in accordance with a preferred embodiment of the present invention.

FIG. 4 shows a diagram of a source node for encapsulating ATM cells in larger packets in accordance with a preferred embodiment of the present invention. Source node 400 includes the ATM cell receiver 410, data packet formatter 430, and timer 420. ATM cell receiver 410 receives data at a data input port on signal 405. The data received is in the form of ATM cells. When ATM cells are received, they are sent from a data output port on ATM cell receiver 410 on signal 412. Also when ATM cells are received, an indication of a received cell is sent on signal 414. Signal 414, output from ATM cell receiver 410, is received by a reset input of timer 420. Timer 420 is configured such that each time the reset input is asserted, timer 420 begins a new count sequence. If the count sequence should complete prior to the reset input being asserted, the terminal count output of timer 420 is asserted on signal 425.

Data packet formatter 430 includes buffer 434, and data packet formatter controller 438. ATM cells sent from ATM cell receiver 410 on signal 412 are received at the data input of data packet formatter 430. The ATM cells on signal 432 are input to buffer 434. When the ATM cells are input to buffer 434, they are optionally compressed. Examples of possible compression schemes include those discussed with reference to FIG. 2 and FIG. 3. When buffer 434 is full, or the packet included therein is otherwise ready for transmission, the data within buffer 434 leaves the buffer on signal 440, and is sent to the data output port of data packet formatter 430. After leaving data packet formatter 430, data packets enter the satellite communications system on signal 450.

Data packet formatter controller 438 included within data packet formatter 430 functions to control the organized building of data packets. Data packet formatter controller 438 can be a hard-wired state machine implemented with discrete parts or in an integrated circuit, or can be a digital processor programmed with software. Data packet formatter controller 438 receives signal 432 which includes ATM cells, and also receives signal 436 from timer 420, which signifies that timer 420 has reached terminal count. Data packet formatter controller 438 can provide many functions including, but not limited to, ATM cell compression, empty cell insertion, and fragment type field control. Data packet formatter controller 438 outputs signal 439 which controls buffer 434. Signal 439 is preferably a plurality of discrete signals that control which portions of buffer 434 are being written with the data on signal 432, and that modify header fields included within the resulting data packets.

When ATM cells are received by ATM cell receiver 410 continuously with low latency between cells, ATM cell receiver 410 periodically asserts signal 414, thereby periodically resetting timer 420. When timer 420 is periodically reset, timer 420 does not reach terminal count, and signal 425 is not asserted. As a result, data packet formatter 430 continuously builds packets as the ATM cells are received, and sends the packets out when they are complete.

When ATM cells are not received by ATM cell receiver 410 continuously, so that a time interval long enough to allow timer 420 to reach terminal count exists between ATM cells, the operation is somewhat different. When timer 420 times out, it signals to data packet formatter 430 that the packet currently being built in the buffer needs to be completed and sent out. This helps to preserve the low latency which is desirable in ATM networks. When data packet formatter controller 438 receives an assertion of signal 436 signifying that timer 420 has reached terminal count, data packet formatter controller 438 takes appropriate action. Depending on whether ATM cells are being compressed, and which of the compression alternatives is currently in use, appropriate actions include setting the fragment type field to a specific descriptor or inserting an empty cell.

In an alternate embodiment, the functionality shown in FIG. 4 is included within a digital processor. In this embodiment, all of, or some of, ATM cell receiver 410, timer 420, and data packet formatter 430 are implemented in a microprocessor, digital signal processor, or the like. In response to program words stored in a memory, the processor receives ATM cells, and builds data packets using a buffer. The processor can also include the functionality of timer 420, either in hardware or software. Other configurations of either hardware and/or software capable of implementing the functionality as shown in FIG. 4 are possible, and these configurations are intended to be included within the scope of the present invention.

Figure 5:
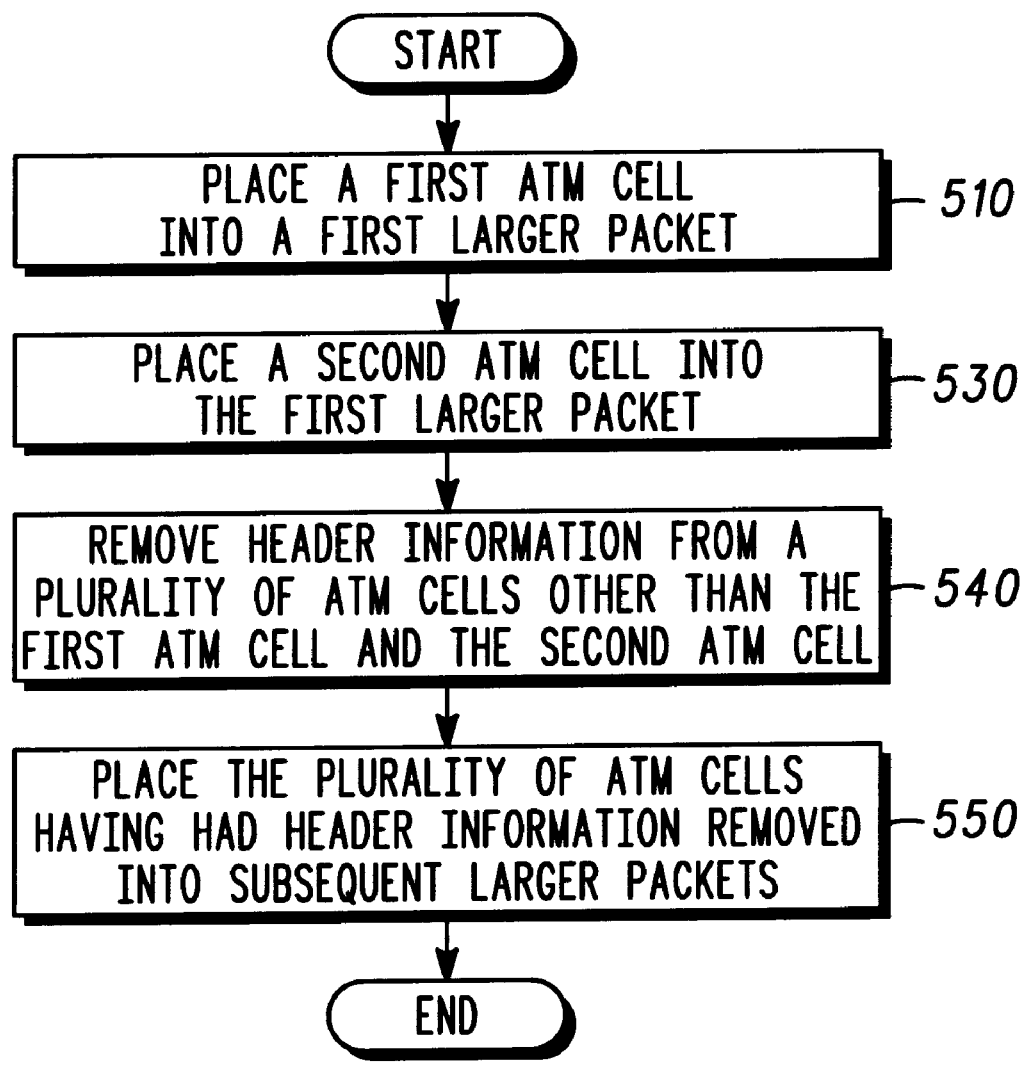
FIG. 5 shows a flowchart for a method of encapsulating ATM cells in larger packets in accordance with a preferred embodiment of the present invention.

FIG. 5 shows a flowchart for a method of encapsulating ATM cells in larger packets in accordance with a preferred embodiment of the present invention. Method 500 begins with step 510 when a first ATM cell is placed into a first larger packet. Then in step 530 a second ATM cell is placed into the first larger packet. Then in step 540 header information is removed from a plurality of ATM cells other than the first ATM cell and the second ATM cell. In step 550 the plurality of ATM cells having had header information removed are placed into packets subsequent to the first larger packet. An exemplary result of method 500 can be seen in FIG. 3 where data packet 240 (FIG. 3) represents the first larger packet referenced in steps 510 and 530 of method 500 in FIG. 5. Also in FIG. 3, data packets 250 and 260 represents the subsequent larger packets referenced in steps 540 and 550 of method 500 in FIG. 5. Of course, method 500 can be utilized in a way that results in data packet formats other than those embodied in data packets 240, 250, and 260 (FIG. 3).

Figure 6:
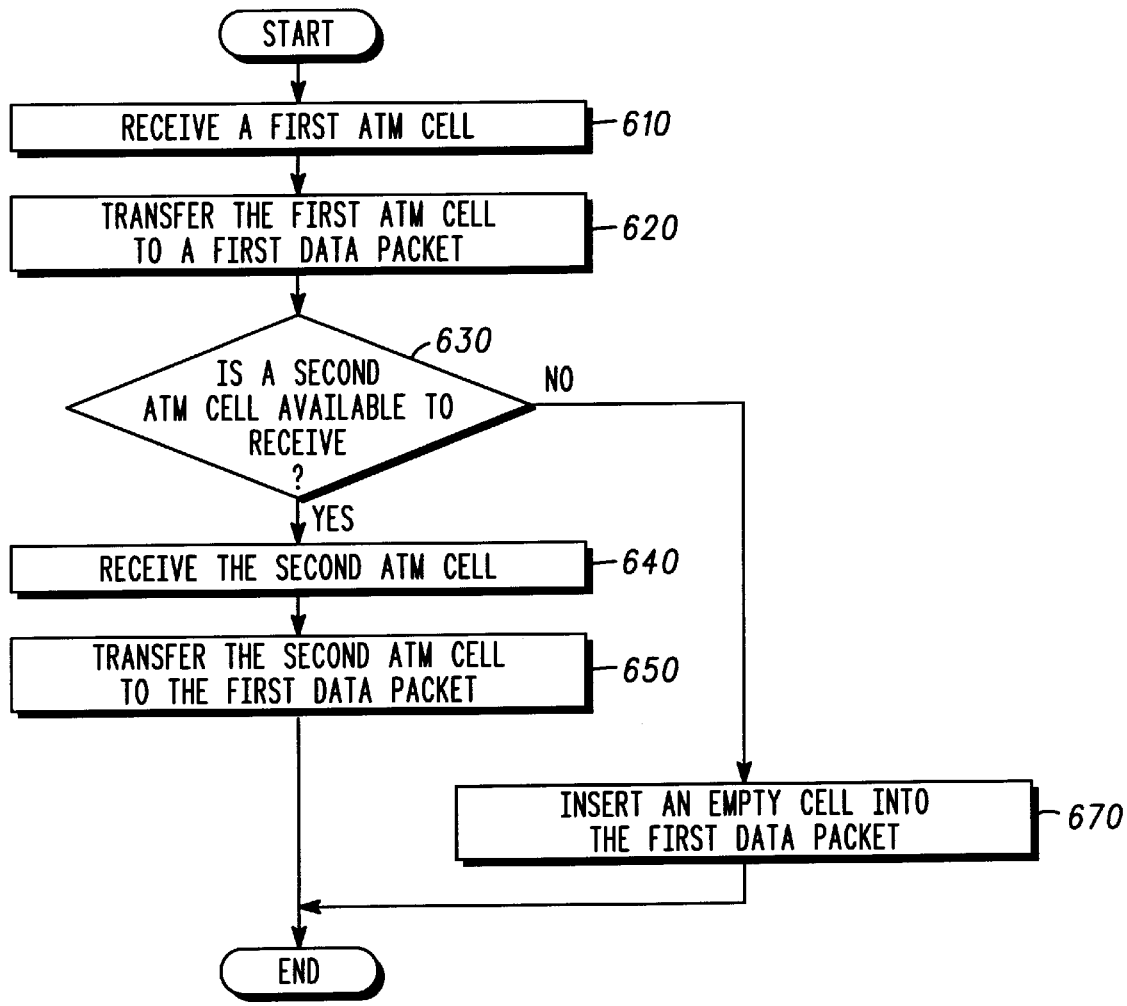
FIG. 6 shows a flowchart for a method of encapsulating ATM cells in larger packets in accordance with an alternate embodiment of the present invention.

FIG. 6 shows a flowchart for a method of encapsulating ATM cells in larger packets in accordance with an alternate embodiment of the present invention. Method 600 begins with step 610 when a first ATM cell is received. In step 620 the first ATM cell is transferred to a first data packet. In step 630 a determination is made as to whether a second ATM cell is available to receive. When a second ATM cell is available to receive, processing proceeds with step 640. In step 640 the second ATM cell is received. Following step 640, the second ATM cell is transferred to the first data packet in step 650, and then processing ends. If, in step 630, it is determined that a second ATM cell is not available to receive, processing proceeds with step 670. In step 670 an empty ATM cell is inserted into the first data packet. An exemplary apparatus capable of performing method 600 is shown in FIG. 4. Data packet formatter 430 transfers ATM cells into data packets through the use of buffer 434 and data packet formatter controller 438. Additionally, data packet formatter controller 438 is capable of inserting an empty ATM cell into data packets as they are being built.

In summary, the method and apparatus of the present invention provides an advantageous means for encapsulating ATM cells into data packets to be used within a broadband satellite communications system. ATM cells are optionally compressed through the removal of redundant header information or error correction information.

While we have shown and described specific embodiments of the present invention, further modifications and improvements will occur to those skilled in the art. For example, the specific embodiments have been described in the context of a satellite communications system. One skilled in the art will appreciate that the method and apparatus of the present invention is applicable to any type of system capable of carrying ATM traffic, and is not intended to be limited to satellite communications systems. We desire it to be understood, therefore, that this invention is not limited to the particular forms shown and we intend in the appended claims to cover all modifications that do not depart from the spirit and scope of this invention.

What is claimed is:

1. A source node for encapsulating ATM cells into data packets to be transmitted through a broadband satellite communications system, said source node comprising:

an ATM cell receiver having a data input and a data output; and a data packet formatter having a data input coupled to the data output of the ATM cell receiver, and having a data output for coupling said source node to said broadband satellite communications system, said data packet formatter comprising means for encapsulating at least one ATM cell into a data packet, means for formatting said data packet for transmission in said broadband satellite communications system, and means for outputting said data packets to said broadband satellite communications system, said data packets being larger than ATM cells, wherein said ATM cell receiver further comprises a received cell indicator output, and said data packet formatter further comprises a send input, and wherein said source node further comprises a timer having a reset input coupled to the received cell indicator output of the ATM cell receiver, and having a terminal count output coupled to the send input of the data packet formatter, whereby said timer is reset each time an ATM cell is received by said ATM cell receiver, and said data packet formatter sends a packet when said timer reaches terminal count.

2. The source node of claim 1 wherein said data packet formatter further includes a data packet formatter controller which sets a fragment type field in said data packets responsive to said send input of said data packet formatter.

3. A system for encapsulating ATM cells into data packets, for transmitting said data packets through a broadband satellite communications system, and for decapsulating said ATM cells, said system comprising:

means for accepting ATM cells;

means for encapsulating a first ATM cell into a first data packet, wherein said data packets are in a format native to said broadband satellite communications system;

means for encapsulating a second ATM cell into said first data packet along with said first ATM cell, wherein neither of said first ATM cell nor said second ATM cell has had header information removed;

means for removing redundant header information from a plurality of ATM cells other than said first two ATM cells;

means for encapsulating said plurality of ATM cells having had header information removed into subsequent data packets, wherein the subsequent data packets are to be transmitted subsequent to said first data packet;

means for sending said first data packet and said subsequent data packets to said broadband satellite communications system;

means for receiving said first data packet and said subsequent data packets from said broadband satellite communications system; and means for decapsulating said first and second ATM cells from said first data packet and for decapsulating subsequent ATM cells from said subsequent data packets.

4. The system of claim 3 further comprising:

means for sending said first, said second, and said subsequent ATM cells to their intended destination.

5. The system of claim 3 wherein said means for removing redundant header information comprises:

means for removing the Header Error Correction field from said plurality of ATM cells other than said first two ATM cells.

6. The system of claim 3 wherein said means for removing redundant header information comprises:

means for removing the entire header from said plurality of ATM cells other than said first two ATM cells.

7. The system of claim 3 wherein said means for removing redundant header information comprises:

means for removing the virtual path identifier (VPI) from said plurality of ATM cells other than said first two ATM cells.

8. The system of claim 3 wherein said means for removing redundant header information comprises:

means for removing the virtual channel identifier (VCI) from said plurality of ATM cells other than said first two ATM cells.

9. The system of claim 3 wherein said first data packet and said subsequent data packets each have a payload field comprising 106 bytes.

10. A method of encapsulating ATM cells into data packets for transmission through a broadband satellite communications system, said method comprising the steps of:

encapsulating a first ATM cell into a first data packet, wherein said data packets are in a format native to said broadband satellite communications system;

placing a second ATM cell into said first data packet;

removing redundant header information from a plurality of ATM cells other than said first ATM cell and said second ATM cell; and placing said plurality of ATM cells having had header information removed into subsequent data packets.

11. The method of claim 10 wherein each of said data packets includes a payload field comprising at least 106 bytes.

12. The method of claim 10 wherein said step of removing redundant header information comprises the step of:

removing all header fields from said plurality of ATM cells other than said first ATM cell and said second ATM cell.

13. The method of claim 10 wherein said step of removing redundant header information comprises the step of:

removing a Header Error Correction field from each of said plurality of ATM cells other than said first ATM cell and said second ATM cell.

14. The method of claim 10 wherein said step of removing redundant header information comprises the step of:

removing a virtual path identifier (VPI) field from each of said plurality of ATM cells other than said first ATM cell and said second ATM cell.

15. The method of claim 10 wherein said step of removing redundant header information comprises the step of:

removing a virtual channel identifier (VCI) field from each of said plurality of ATM cells other than said first ATM cell and said second ATM cell.

* * * * *